United States Patent [19]

Meinecke et al.

[11] 4,068,883
[45] Jan. 17, 1978

[54] WIND DEFLECTOR CONFIGURATION

[75] Inventors: Steven L. Meinecke, Woodbridge, Va.; Walter Selden Saunders, Baltimore, Md.

[73] Assignee: Walter Selden Saunders, Baltimore, Md.

[21] Appl. No.: 585,843

[22] Filed: June 11, 1975

[51] Int. Cl.² ............................................. B62D 35/00
[52] U.S. Cl. ...................................... 296/1 S; 296/91
[58] Field of Search ................ 296/1 S, 91; 105/2 A; 180/1 FV; D12/181, 93, 96

[56] References Cited

U.S. PATENT DOCUMENTS

| | | | |
|---|---|---|---|
| 2,229,516 | 1/1941 | Metzger | 296/91 |
| 3,015,517 | 1/1962 | Thornburgh | 296/91 |
| 3,241,876 | 3/1966 | Saunders | 296/1 S |
| 3,309,131 | 3/1967 | Saunders | 296/1 S |
| 3,348,873 | 10/1967 | Saunders | 296/1 S |
| 3,697,120 | 10/1972 | Saunders | 296/1 S |
| 3,854,769 | 12/1974 | Saunders | 296/1 S |
| 3,934,923 | 1/1976 | Lissaman | 296/1 S |

Primary Examiner—Joseph F. Peters, Jr.
Assistant Examiner—Michael J. Forman
Attorney, Agent, or Firm—Mattern, Ware, Davis and Stoltz

[57] ABSTRACT

By providing an upstanding drag reducing baffle wherein the upper edge of said baffle comprises smoothly curved extension portions on both sides thereof, lying in substantially the same plane of the baffle, an improved wind deflector capable of increased drag reduction is achieved. In the preferred embodiment, these extension portions extend from the edge of the baffle toward the center and comprise at least half the distance from the edge to the mid-point of the baffle. Also, in the preferred embodiment, a front curved vortex stabilizer, a portion of which extends above the wind deflector, is used in combination with the wind deflector for additional drag reduction.

15 Claims, 7 Drawing Figures $\frac{h}{H} = \frac{H}{W/2}$ FOR COE CAB STREIGHT TRUCKS GRAPH 1  $\frac{h}{H}$ vs. $\frac{H}{W/2}$

WIND DEFLECTOR CONFIGURATION

BACKGROUND OF THE INVENTION

This invention relates to drag reducing apparatus for use on land vehicles and more particularly to upstanding wind deflectors and vortex stabilizers for mounting on land vehicles.

It has long been known that land vehicles, especially single chassis trucks and tractor-trailer trucks, while moving through a fluid consume a great deal of energy in overcoming wind resistance. Although various systems for attempting to deal with this problem have long been tried, a few years ago substantial progress was made in the production of an upstanding baffle for drag reduction. This baffle or wind deflector was invented by Walter Selden Saunders and is disclosed in his U.S. Pat. Nos. 3,241,876; 3,309,131; and 3,348,873. Mr. Saunders also discovered that energy can be conserved by employing vortex stabilizers and this advance in the art is disclosed and claimed in the U.S. Pat. No. 3,697,120.

Although the wind deflector disclosed and claimed in Saunders' Patents has been able to obtain substantial reduction in fuel consumption, improvements have been sought to increase the amount of fuel savings obtained. Until now, any improved drag reducing systems have not effectively increased fuel savings, have been expensive to purchase, and have required a completely new investment in mounting hardware.

OBJECTS OF THE INVENTION

Therefore, it is the principal object of this invention to provide an improved wind deflector which is capable of superior drag reduction over conventional wind deflectors.

A further object of this invention is to provide an improved wind deflector of the above character which is inexpensive to manufacture.

A further object of this invention is to provide an improved wind deflector of the above character which is quickly and easily installable and is compatible with equipment hardware presently employed with conventional wind deflectors.

Other and more specific objects will in part be obvious and will in part appear hereinafter.

SUMMARY OF THE INVENTION

It has now been found that by providing conventional wind deflectors, such as the ones disclosed in the Saunders' Patents, with an additional extension portion along the top surface thereof, the resulting wind deflector is capable of attaining drag reduction results superior to the conventional wind deflectors and heretofore believed unattainable. In the preferred embodiment, the extension portion is smoothly curved and extends from both sides of the wind deflector along top edge of the baffle toward the center thereof, occupying at least 50 percent of this half-width. Although the particular shape and configuration employed in the extension portion is basically a matter of design choice, it has been found that sharp edges should be avoided and all corners should be smoothly rounded or curved. In this way, smooth flow of the deflected air is assured and substantial additional drag reduction is achieved.

By employing this improved wind deflector, greater drag reduction can be obtained by merely substituting this newly developed wind deflector for the presently employed wind deflectors. In this way, mounting hardware associated with present-day wind deflectors can be used and the improved benefits of this improved configuration for drag reduction can be obtained with a minimum of investment.

It has long been known that by combining the wind deflector with a vortex stabilizer, additional drag reduction is obtained, especially when side winds of large yaw angles are present. It has now been discovered that improved drag reduction is achieved when the forward edge of the vortex stabilizer is rounded and a portion of the vortex stabilizer extends above the wind deflector.

The invention accordingly comprises the features of construction, combination of elements and arrangement of parts which will be exemplified in the constructions hereinafter set forth, and the scope of the invention will be indicated in the Claims.

THE DRAWINGS

For a fuller understanding of the nature and objects of the invention, reference should be had to the following detailed description taken in conjunction with the accompanying drawings, in which.

Figure 6:
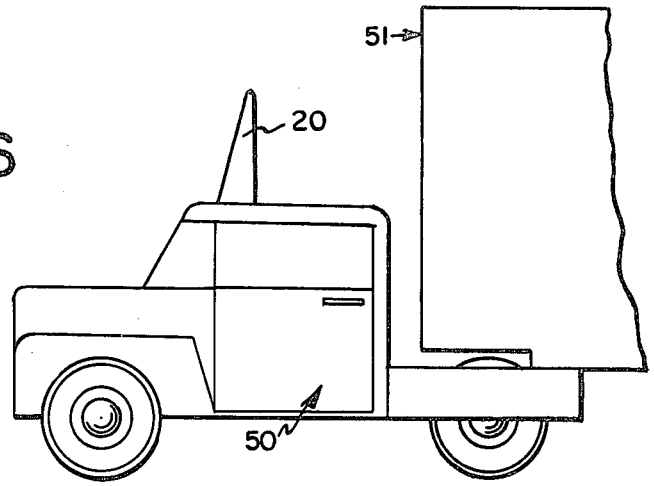
Figure 7:
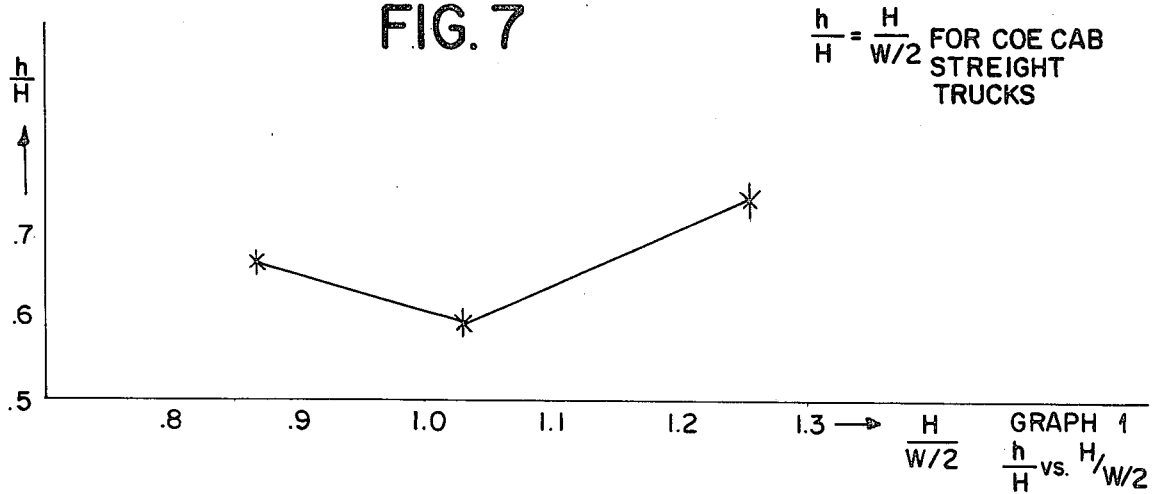

FIG. 6 is a side elevation view of the improved wind deflector of this invention mounted on the roof of a conventional cab tractor of a tractor-trailer unit; and FIG. 7 is a sketch of a chart showing the ratio of the height of the wind deflector (h) to the cab roof to van roof height (H) as a function of the ratio of the cab roof to van roof height (H) to the half-width of the van (W) for COE cab straight trucks.

DETAILED DESCRIPTION

Figure 1:
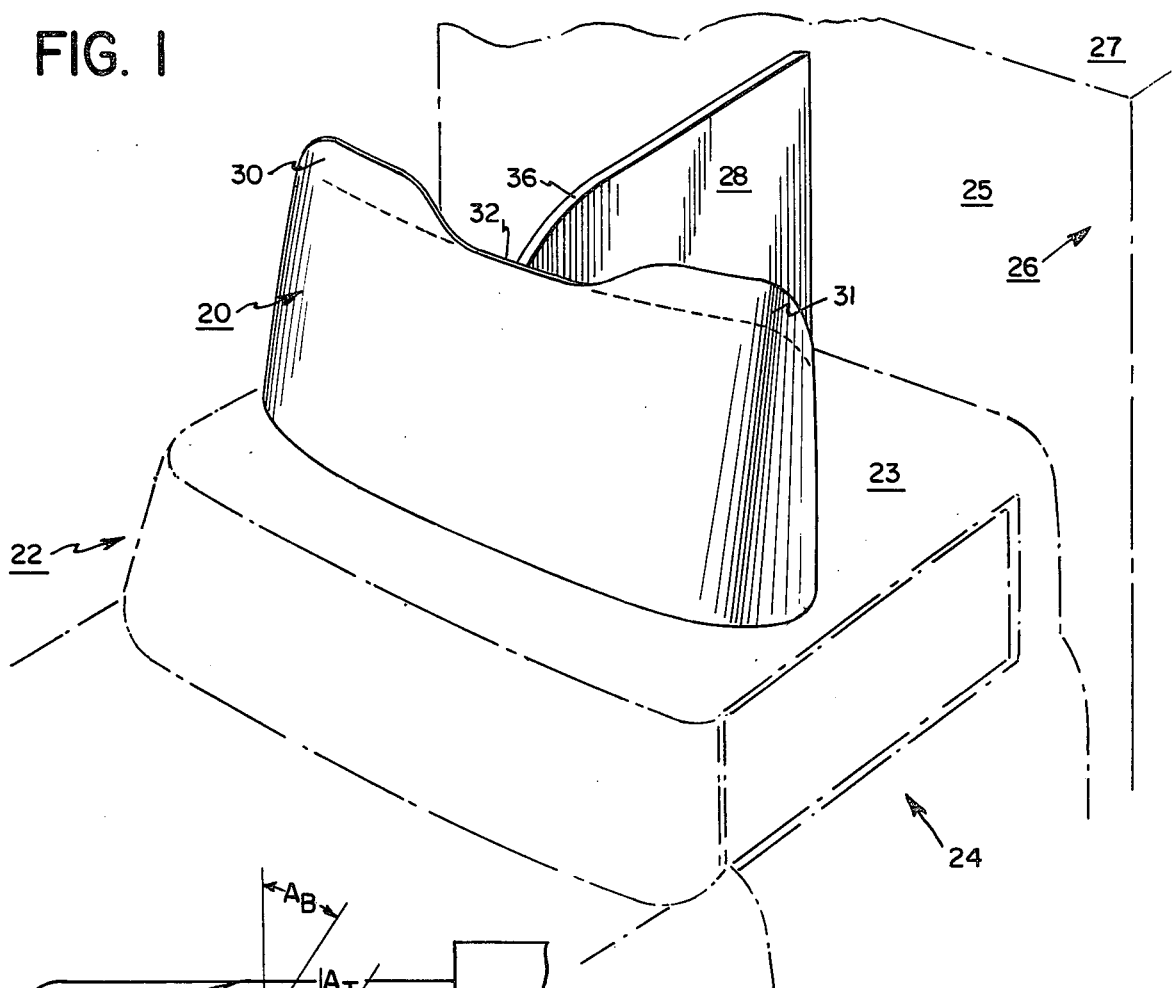
FIG. 1 is a perspective view of the improved wind deflector and vortex stabilizer of this invention mounted to the roof of a conventional cab of a single chassis truck.

In FIG. 1, an improved wind deflector 20 is shown mounted on a conventional straight truck 22 having a cab 24 and a van 26. Cab 24 has a roof 23, and van 26 has a vertically oriented front wall 25 and a roof top 27. In the preferred embodiment, wind deflector 20 is used in combination with a vortex stabilizer 28 which is also mounted to conventional straight truck 22. Although the incorporation of vortex stabilizer 28 is preferred for improved drag reduction, the inclusion of vortex stabilizer 28 is completely optional as is further discussed below.

Improved wind deflector 20 comprises extension portion 30 and 31 positioned along top edge 32 of wind deflector 20 on both sides thereof and extending to the side of wind deflector 20. In FIG. 1, wherein the general configuration of prior art wind deflectors is shown in phantom, the precise configuration of extension portions 30 and 31 can best be seen.

Figure 5:
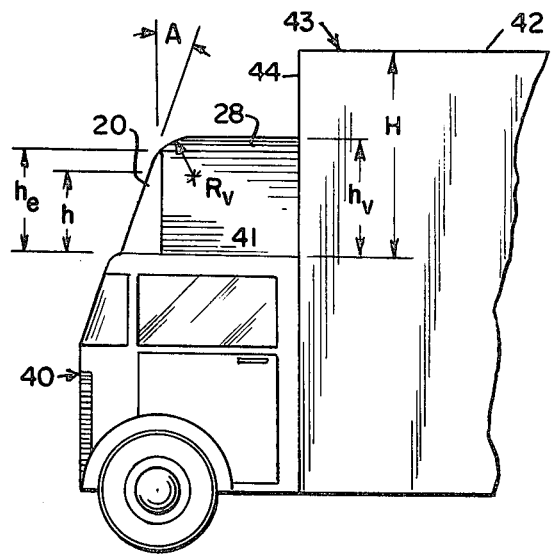
FIG. 5 is a side elevation view of the improved wind deflector and vortex stabilizer of this invention mounted to the roof of the cab-over-engine cab of a single chassis truck.

Various tests have been performed with improved wind deflector 20 in order to determine the efficacy of extension portions 30 and 31. These tests have proven that improved wind deflector 20 increases the drag reduction obtained with conventional wind deflectors on conventional cab straight trucks, as shown in FIG. 1, on COE (cab-over-engine) straight trucks as shown in FIG. 5, and on tractor-trailer combinations employing either conventional tractors or COE tractors.

It is believed that the extension portions 30 and 31 produce a more uniform flow of the fluid over the roof of the van or trailer, thereby providing the additional drag reduction which has been achieved. Furthermore, a significant increase in drag reduction has been provided over a useful range of yaw angles from 0° – 10°. In other words, a prevailing wind need not be directly toward wind deflector 20, but can be from the side of the vehicle over a wide range of angles, and wind deflector 20 still provides improved drag reduction.

Figure 2:
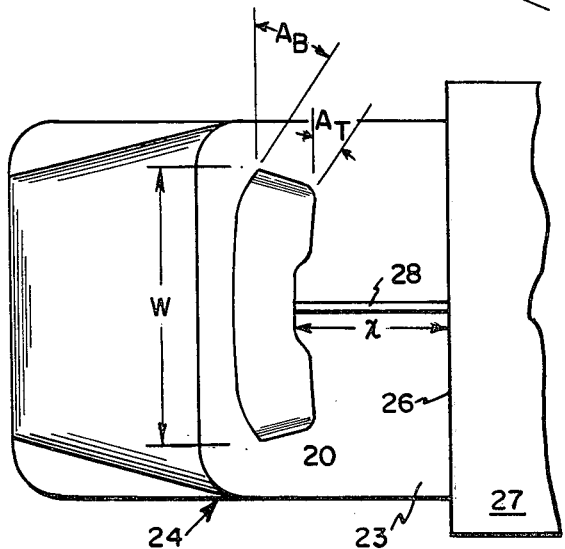
FIG. 2 is a top plan view of the improved wind deflector and vortex stabilizer of this invention mounted as in FIG. 1.
Figure 3:
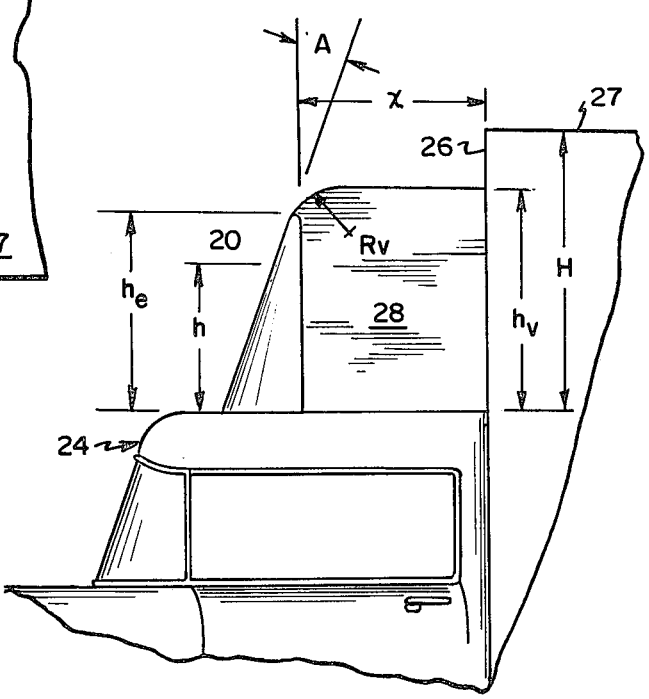
FIG. 3 is a side elevation view of the improved wind deflector and vortex stabilizer of this invention mounted as in FIG. 1.
Figure 4:
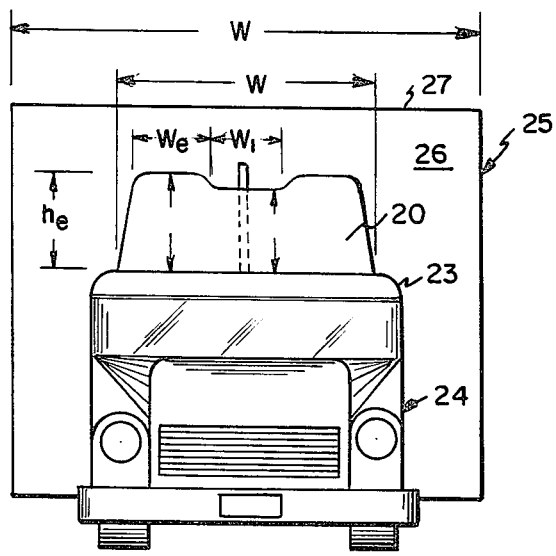
FIG. 4 is a front elevation view of the improved wind deflector and vortex stabilizer of this invention mounted as in FIG. 1.

During the testing program conducted, various preferred dimensional ratios for wind deflector 20 were establishes. In order to more fully understand these preferred dimensional ratios, reference should be had to FIGS. 2–4 for the definitions of specific dimensions. Wind deflector 20 is mounted to cab roof 23 of cab 24 at a slant-back angle equal to "A". The slant-back angle is also referred to as the release angle in the vertical plane. Also, wind deflector 20 comprises a side release angle at the top thereof equal to "$A_T$", and a side release angle at the bottom thereof equalto "$A_B$". Wind deflector 20 is positioned on cab roof 23 ahead of the panel 25 of van 26 at a distance equal to "x", wherein "x" is the distance between the panel 25 of van 26 and edge 32 of wind deflector 20. Wind deflector 20 also comprises an over-all maximum vertical height of "$h_e$" extending from the top of the extension portion to the bottom of wind deflector 20; and a second height "h", which is equal to the height of wind deflector 20 from the base of the wind deflector to top edge 32 at the center line of the wind deflector 20.

Van 26 comprises an over-all width of "W", while wind deflector 20 comprises an over-all width "w" and additional widths of "$w_e$" equal to the width of the extension portion 30 and 31 and "$w_i$" equal to the width of the intermediate zone between extension portions 30 and 31. The final dimension which needs to be established is the dimension "H" which is defined as the distance between the top of cab roof 23 and the roof 27 of van 26.

In the testing program that was conducted, it was established that maximum drag reduction was obtained when the following conditions are met:

$$A = 15° \quad \frac{h}{H} = 0.67 \quad \frac{x}{\frac{W}{2}} = 0.66$$

$$A_T = 22° \quad \frac{h_e - h}{H} = .06 \quad \frac{w}{W} = 0.75$$

$$A_B = 33°$$

By employing these preferred dimensional ratios, the specific size and shape of wind deflector 20 can be established for any land vehicle configuration.

For example, using a conventional cab on a straight truck having a van width (W) of 8 feet and a van height over the cab roof (H) of 4 feet, the precise configuration of improved wind deflector 20 can be easily determined. The height (h) of wind deflector 20 along the center line thereof should be 2.68 feet, and the extension portions 30 and 31 should have a vertical height of 0.24 feet, thereby providing wind deflector 20 with an over-all height ($h_e$) from the base thereof to the top of the extension portions of 2.92 feet. The over-all width (w) of wind deflector 20 should be 6 feet, and wind deflector 20 should be positioned on cab roof 23 ahead of panel 25 of van 26 with top edges 32 thereof at a distance (x) 2.64 feet from panel 25.

As shown in FIG. 5, and discussed above, wind deflector 20 can also be employed on a COE cab 40 of a straight truck. Tests were conducted for a COE straight truck, and it was established that maximum drag reduction was obtained when the following conditions were met:

$$A = 15° \quad \frac{h_e - h}{H} = .06$$

$$A_T = 22° \quad \frac{x}{\left(\frac{W}{2}\right)} = 0.66$$

$$A_B = 33° \quad \frac{w}{W} = .625$$

The preferred height (h) of wind deflector 20 along its center line depends on the value of H, the height difference between the roof 41 of the COE cab 40 and the roof 42 of the van 43. By employing the chart shown in FIG. 7, after the "H/(w/2)" is determined, the ratio of the center line height of wind deflector 20 (h) to the cab roof 41 to van roof 42 height (H) can easily be found. Once this height ratio has been established, the preferred height of the wind deflector 20 (h) is quickly established. The use of the chart in FIG. 7 is required in order to find the preferred height of wind deflector 20, since it has been discovered that the height ratio of the wind deflector height to the van-over-cab roof height is not a constant ratio but varies with the value of H, the height between the cab roof 41 and the van roof 42.

It has also been discovered that vortex stabilizer 28 provides improved drag reduction when the top of vortex stabilizer 28 extends above wind deflector 20, as shown in FIGS. 1, 3, 4 and 5. Furthermore, leading edge 36 of vortex stabilizer 28 should be gently curved in order to assure uniform flow of the fluid and provide improved drag reduction. Generally, any smooth curve at edge 36 of vortex stabilizer 28 is acceptable, but it has been determined that optimum results are achieved when the radius of curvature ($R_v$) of edge 36 of vortex stabilizer 28 equals 0.24 multiplied by the half-width of van 43. In the preferred embodiment, the entire edge of vortex stabilizer 28 is gently curved with the greater radius of curvature existing at the front edge 36.

The optimum height ($h_v$) of the vortex stabilizer has been found to be a constant ratio depending upon the center line height (h) of wind deflector 20 and the difference in height (H) between cab roof 41 and van roof 42. Generally, it has been discovered that the increased height of the vortex stabilizer over the center line height of wind deflector 20 ($h_v - h$) should be equal to 0.14 multiplied by the difference in height (H) between cab roof 41 and van roof 42.

Specific tests were conducted in order to determine the preferred dimensional ratios for establishing the exact radius of curvature ($R_v$) and the height ($h_v$) of the vortex stabilizer when employed in combination with wind deflector 20 on conventional cab single chassis truck: the following two formulae define these preferred dimensional ratios:

$h_v/H = .81$ $R_v/(W/2) = .24$

Similar tests were also conducted for COE cab straight trucks in order to determine the exact configuration for the vortex stabilizer used on a COE cab straight truck with wind deflector 20. The results of these tests developed the following two preferred dimensional ratios:

$h_v - h/H = .14$ $R_v/W_2 = .24$

It is important to note that the preferred ratios given in the specification for the sizing of wind deflector 20 and vortex stabilizer 28 represent the optimum dimensional ratio for the combination of wind deflector 20 and vortex stabilizer 28 on the particular style cab. However, the optimum dimensional ratios can be varied without radically changing the drag reducing effects produced by the general construction of wind deflector 20 and vortex stabilizer 28 described throughout the specification. No precise criticality for these specific ratios is believed to exist, and variations from these specific ratios can be employed without departing from the scope of the invention disclosed herein. Furthermore, these specific ratios are for the combination of wind deflector 20 with vortex stabilizer 28 and the use of either one of these elements without the other will most likely result in variation of the optimum dimensional ratios.

During the testing program conducted for determining the efficacy of the combination of improved wind deflector 20 and vortex stabilizer 28, it was discovered that improved drag reductions of 20 percent over the drag reduction obtained with conventional wind deflectors is achieved when the prevailing wind is head-on. As the prevailing wind is shifted from head-on into winds of increasingly greater yaw angles, the improved drag reduction was somewhat reduced until a yaw angle of 10 degrees was reached. At a yaw angle of 10°, no increase drag reduction was observed, but the drag reduction was substantially identical to the drag reduction previously obtained with conventional wind deflectors.

As mentioned above, wind deflector 20 of this invention can also be employed without vortex stabilizer 28 on tractor-trailer combinations employing either conventional tractors or COE tractors. As shown in FIG. 6, for exemplary purposes only, wind deflector 20 is mounted on conventional tractor 50 and employed for pulling trailer 51. Since tractor-trailer combinations have of necessity a variable size gap between the rear wall of the tractor and the leading panel of the trailer, the dimensional ratios employed for single chassis trucks do not apply. Much work has been done in the optimum location of wind deflectors on tractors, and the results are found in United States Patents of Walter Selden Saunders enumerated above. It is believed that the location of improved wind deflector 20 on a conventional tractor 50 or a COE tractor (not illustrated herein) should follow the guidelines established in the Saunders' Patents. However, by employing the improved wind deflector of this invention, greater drag reduction is obtained over conventional wind deflectors.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following Claims are intended to cover all of the generic and specific features of the invention herein described, and all statements of the scope of the invention in which, is a matter of language, might be said to fall therebetween.

Having described our invention, what we claim as new and desire to secure by Letters Patent is:

1. A wind deflector for mounting to land vehicles forward of a drag producing surface and comprising upstanding baffle means positioned above a substantially horizontal surface for deflecting oncoming air over the drag producing surface and thereby reducing the drag caused by said surface and comprising:
    A. a substantially rectangular frontal shape generally convex in a horizontal plane as viewed from the front and generally angled in the vertical plane toward the rear; and
    B. at least one extension portion
        a. positioned about an upper corner of said substantially rectangular baffle means, and
        b. increasing the height dimension of the baffle means at said corner, and
        c. said extension substantially smoothly continuing said convex and rear angled contour of said frontal shape,
thereby providing a wind deflector with improved drag reduction capabilities.

2. The wind deflector defined in claim 1, wherein two extension portions are positioned about both upper corners of said substantially rectangular baffle means.

3. The wind deflector defined in claim 1, wherein said extension portion is positioned about the upper corner of said substantially rectangular baffle means extending from the side thereof toward the center thereof along the top edge thereof.

4. The wind deflector defined in claim 3, wherein said extension portion comprises one-fourth the width of said rectangular shaped baffle means.

5. The wind deflector defined in claim 1, wherein said extension portion lies in the same plane as said baffle means.

6. The wind deflector defined in claim 1, wherein said extension portion is smoothly curved at all corners exposed to fluid flow.

7. On a land vehicle having a substantially horizontal surface spaced ahead of a substantially vertical drag producing panel and being lower in height than the top of the trailing vertical panel, a drag reducing system for mounting to said vehicle comprising:
    A. a wind deflector comprising upstanding baffle means
        a. positioned above the substantially horizontal surface, for deflecting oncoming air over the vertical drag producing panel to produce a large vortex of air behind said baffle, said vortex having a substantially horizontal axis and thereby reducing the drag caused by said panel, and incorporating
        b. a substantially rectangular frontal shape and
        c. at least one extension portion 1. positioned about an upper corner of said substantially rectangular baffle means, and
2. increasing the height dimension of the baffle means at said corner,
3. said extension portion forming with said frontal shape a continuous smooth convex surface in a horizontal plane as viewed from the front at said extension and at its boundary with said frontal shape; and B. a vortex stabilizer extending above said substantially horizontal surface and extending from said wind deflector toward said trailing vertical panel.

8. The drag reducing system defined in claim 7, wherein said vortex stabilizer is positioned substantially perpendicular to said wind deflector at substantially the center line thereof, and comprises a vertical height greater than the vertical height of the wind deflector at its center line.

9. The drag reducing system defined in claim 8, wherein the height of said vortex stabilizer over the height of said wind deflector along its center line is equal to 0.14 multiplied by the difference in height between said trailing vertical panel and said leading, substantially horizontal surface.

10. The drag reducing system defined in claim 7, wherein said vortex stabilizer comprises a gently curved leading edge adjacent to said wind deflector.

11. The drag reducing system defined in claim 10, wherein the radius of curvature of said leading edge of the vortex stabilizer is equal to 0.24 multiplied by the half-width of said trailing vertical surface.

12. The drag reducing system defined in claim 7, wherein said extension portion comprises a vertical height equal to 0.66 multiplied by the difference in height between said trailing vertical surface and said leading horizontal surface.

13. The drag reducing system defined in claim 7, wherein said wind deflector is spaced ahead of said trailing vertical surface by a distance equal to 0.66 multiplied by the half-width of said trailing vertical surface.

14. The drag reducing system defined in claim 7, wherein the height of the vortex stabilizer is equal to 0.81 multiplied by the difference in height between said trailing vertical panel and said leading, substantially horizontal surface.

15. On a land vehicle incorporating a leading member having a substantially horizontal surface and a trailing wall and a trailing member having a drag producing leading panel defining a gap between said members, a wind deflector for mounting to said leading member comprising upstanding baffle means positioned above said substantially horizontal surface ahead of said leading panel of said trailing member for deflecting oncoming air over said leading panel to produce a large vortex of air behind said baffle said vortex having a substantially horizontal axis substantially parallel to said baffle and reducing the drag caused by said panel, and comprising:

A. a substantially rectangular frontal shape; and
B. at least one extension portion positioned about an upper corner of said substantially rectangular baffle means, increasing the height dimension of the baffle means in the area of said corner, smoothly joined to said frontal shape in a continuous surface convex in a horizontal plane as viewed from the front at said extension and at its boundary with said frontal shape and causing the top edge of the baffle means to be non-planar, thereby providing a wind deflector with improved drag reduction capabilities.

* * * * *